(No Model.)

H. ZWEIFFEL.
LUBRICATOR.

No. 290,382.      Patented Dec. 18, 1883.

Witnesses:
John C. Tunbridge.
John M. Speer.

Inventor:
Heinrich Zweiffel
by his attorneys
Briesen & Steele

UNITED STATES PATENT OFFICE.

HEINRICH ZWEIFFEL, OF KALK, NEAR COLOGNE, GERMANY.

LUBRICATOR

SPECIFICATION forming part of Letters Patent No. 290,382, dated December 18, 1883.

Application filed September 20, 1883. (No model.) Patented in Germany December 28, 1881, No. 19,931.

*To all whom it may concern:*

Be it known that I, HEINRICH ZWEIFFEL, a resident of Kalk, near Cologne, Rhine, Germany, have invented an Improved Lubricator, of which the following is a specification, reference being made to the accompanying drawings, in which—

Figure 1:
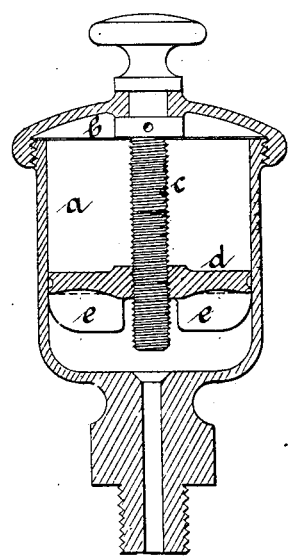
Figure 2:
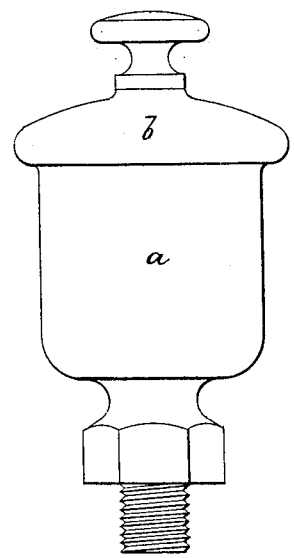

Figure 1 represents a vertical central section of my improved lubricator, and Fig. 2 is a side view of the same.

This invention (for which I have obtained a German Patent, No. 19,931, for fifteen years from December 28, 1881) has for its object to produce a lubricator with a movable plunger, so constructed that the plunger will have rectilinear motion imparted to it, but not rotary motion; hence, the plunger will not agitate the lubricating matter, but will, while descending in a straight line and without turning, only crowd the lubricating matter out into the place desired.

In the accompanying drawings, the letter $a$ represents a cylindrical lubricating vessel or cup. $b$ is its lid or cover, which is screwed upon the cup, as shown in Fig. 1.

$c$ is the screw for moving the plunger. This screw is swiveled in the cover $b$, as shown.

$d$ is the plunger, which is threaded to receive the screw $c$. This plunger has, on its under side, downwardly-projecting ribs $e$, which, entering the lubricating matter below, will prevent the plunger from revolving, and cause it to move solely in a rectilinear direction.

Instead of providing the plunger with these ribs, other means for preventing it from turning may be employed. Thus, the cup $a$ may be made oval and the plunger oval to fit it, or they may be joined by feather and groove to prevent rotation of the plunger, or they may be made angular, or the screw $c$ may be placed eccentrically through the cover $b$, and through the circular plunger $d$, or the plunger may have a tightly-fitting packing-ring which, bearing against the inner face of the cup, will prevent its rotation.

It will be seen that the screw $c$, being swiveled in the cover $b$, will naturally have the tendency to move the plunger simply in a rectilinear direction, the danger of turning it being dependent on the less or greater resistance which is offered to the progress of the plunger by the lubricating matter.

It follows that the ribs $e$, dipping into the lubricating matter, will be as good a means as any more positive arrangement for preventing rotation of the plunger.

I claim—

1. The combination of the lubricator-cup $a$ and its cover $b$ with the swiveled screw $c$, plunger $d$, and means, substantially as described, for preventing the rotation of said plunger during its descent under the influence of the screw, as specified.

2. The combination of the lubricator-cup $a$ and its cover $b$ with the swiveled screw $c$, plunger $d$, and downwardly-projecting ribs $e$ on said plunger, substantially as specified.

In testimony whereof I have signed my name to this specification in the presence of two subscribing witnesses.

HEINRICH ZWEIFFEL.

Witnesses:
C. KURTZ,
TH. GEITMANN.